United States Patent [19]

McCorkle

[11] Patent Number: 5,469,174
[45] Date of Patent: Nov. 21, 1995

[54] PULSE TRANSMITTER FOR TERMINATING REFLECTED WAVES

[76] Inventor: John McCorkle, 8709 Oxwell La., Laurel, Md. 20708-2453

[21] Appl. No.: 160,303
[22] Filed: Dec. 1, 1993
[51] Int. Cl.⁶ ............................................. G01S 13/00
[52] U.S. Cl. ............................................. 342/203; 367/903
[58] Field of Search ............................ 342/202, 435, 342/203; 367/903

[56] References Cited

U.S. PATENT DOCUMENTS

| | | | |
|---|---|---|---|
| 3,774,112 | 11/1973 | Panico | 367/903 |
| 3,982,425 | 9/1976 | McLain | 367/903 |
| 4,025,924 | 5/1977 | Luedtke et al. | 342/435 |
| 4,486,867 | 12/1984 | Hill | 367/903 |
| 5,199,299 | 4/1993 | Hughes et al. | 367/903 |

Primary Examiner—Daniel T. Pihulic
Attorney, Agent, or Firm—Freda L. Krosnick; Frank J. Dynda

[57] ABSTRACT

A pulse transmitter for terminating reflected waves is disclosed which utilizes a series switched charged line pulse generator with a shunt element that is switched into the circuit immediately after the pulse is launched into an output line. The shunt element terminates any reflected wave so that it does not go back into the output line. The shunt element is formed by an optically controlled PIN diode coupled in series to a resistor which allows the circuitry to turn on fast and to handle high voltage pulses. The shunt element can be connected to either the input end of the charge line for circuitry embodiments in which the series switch stays closed or the shunt element can be connected at the output side of the series switch for embodiments in which the series switch opens after the pulse is formed such as, for example, where an avalanche switch is used.

11 Claims, 1 Drawing Sheet

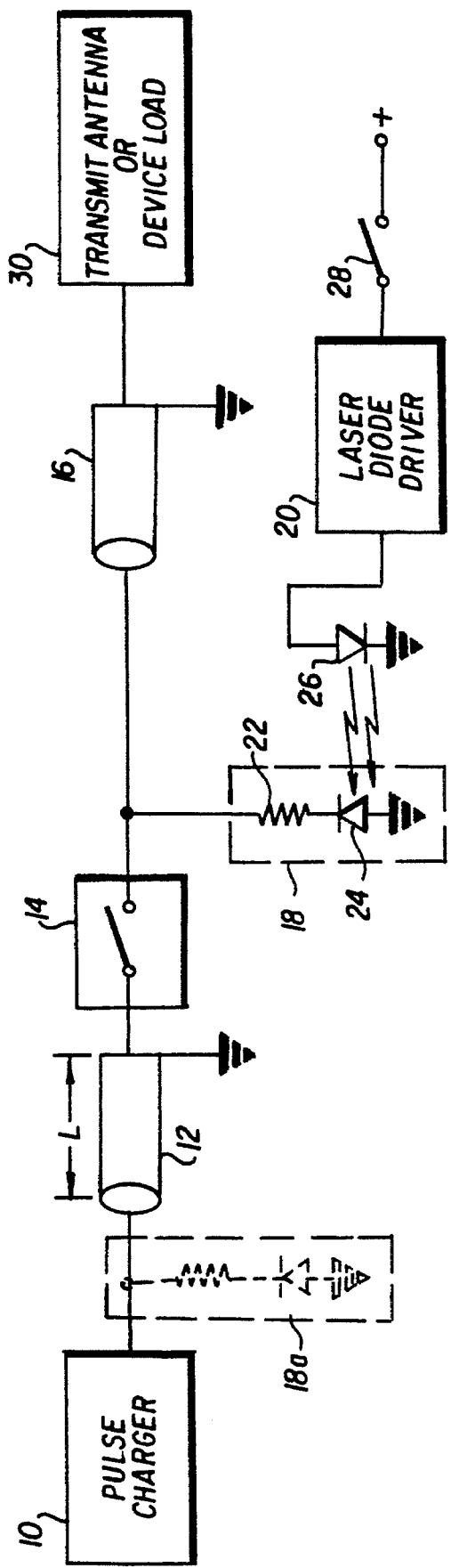

PULSE TRANSMITTER FOR TERMINATING REFLECTED WAVES

BACKGROUND OF THE INVENTION

The present invention relates to the generation of pulse signals for use in sensors such as radars. More particularly, the present invention relates to the generation of pulse signals for impulse and ultra wide band radars.

As is known in the art, impulse radar is presently being used in a variety of radar systems in order to determine the location of aircraft, ground vehicles, people, mines, buried pipes, and faults in roadways, tunnels, leaking buried pipes, etc. However, a problem that arises in connection with the use of impulse radar is the reflection of the transmitted pulse by the transmitting antenna itself. That reflection causes an exponentially decaying oscillation as the pulse reflects back and forth between the transmitter and the antenna. In some instances, that oscillation can be so strong and last so long that it masks the intended target.

Although some common methods for minimizing the problem of transmitted pulse reflection by the transmitting antenna have been developed, such methods have been, to date, less than satisfactory. Common methods for minimizing that problem are to add a loss to the transmission line, add a loss to the antenna or to design a transmitter that will terminate the reflected wave. Adding losses to either the transmission line or the antenna have the disadvantage of wasting a portion of the transmitter power. Designing a transmitter to terminate the reflected wave has, to the present time, resulted in inefficient and bulky designs, which are unsatisfactory. Therefore, there still exists a need in the art for a pulse generator that terminates any reflected wave, yet is small and efficient and can be economically manufactured.

SUMMARY AND OBJECTS OF THE INVENTION

In view of the foregoing, it should be apparent that there still exists a need in the art for an impulse transmitter system that is both small and efficient yet also terminates any reflected waves. It is, therefore, a primary object of this invention to provide an impulse transmitter system which is characterized by simple and uncomplicated electronic circuitry and which it can be economically manufactured.

More particularly, it is an object of this invention to provide an impulse transmitter system having simple and reliable electronic circuitry and which does not require frequent alignment nor costly components.

More particularly, it is an object of this invention to provide an impulse transmitter system which terminates any reflected waves created by the transmitter system.

Briefly described, these and other objects of the invention are accomplished in the impulse transmitter system of the present invention by utilizing a resistive shunt element connected to a charged line pulse generator circuit. The shunt element is triggered such that it is opened when the pulse is generated but functions as a termination impedance immediately after the pulse is launched out of the charged line. Using such a structure, the shunt element does not attenuate the outgoing pulse generated by the pulse generator component of the charged line pulse generator circuit, yet the shunt element functions to terminate any energy echoed back through the output transmission line.

The shunt element can be connected to either the back end of the charge line of an embodiment in which the series switch stays closed, or it can be connected to the output side of the switch in an embodiment in which the series switch remains open after the pulse is formed. The shunt element device is selected according to the pulse voltage.

With these and other objects, advantages and features of the invention that may become hereinafter apparent, the nature of the invention may be more clearly understood by reference to the following detailed description of the invention, the appended claims and to the drawing attached herein.

BRIEF DESCRIPTION OF THE DRAWING

The FIGURE is a block diagram showing the apparatus of the present invention.

DETAILED DESCRIPTION OF THE PREFERRED EMBODIMENT

Referring now in detail to the drawing which depicts a block diagram of the instant pulse transmitter which terminates any reflected waves, there is shown a pulse charger 10 which is connected to a charge line 12 of length L. The output side of the charge line 12 is connected to a switch 14 which may be, for example, an avalanche type switch.

The switch 14 is connected to both an output or feed line 16, as well as to a shunt element 18. The shunt element may preferably be comprised of a series connected resistor 22 and PIN diode 24. The other end of the resistor 22 is connected to the output side of the switch 14. The terminal of the PIN diode 24 not connected to the resistor 22 is connected to ground. The PIN diode is activated by a laser diode 26 which is driven by a laser diode driver 20. A laser diode switch 28 is connected to provide switched power to the laser diode driver 20 and thus to switch the laser diode 26 on and off, thus triggering the PIN diode 24.

The pulse transmitter of the present invention operates as follows. First, the pulse charger 10 charges the charge line 12. When the main transmit switch 14 is closed, a pulse of approximately two times the length of the charge line 12 (2 L) in length is launched into the output cable 16. Next, assuming that the main transmit switch 14 is preferably an avalanching device, it automatically opens when the current from the charge line 12 ceases flowing. The laser diode driver switch 28 is then closed, which causes the laser diode 26 to emit its laser light. That in turn causes the PIN diode 24 which forms part of the shunt element 18 to conduct, thus connecting the shunt element 18 across the output of the switch 14. Therefore, any mismatch in the transmit antenna or load 30 seen by the transmit line 16 is reflected back.

When the reflected wave arrives at the now open main transmit switch 14, it is terminated in the shunt network 18 by being shunted to ground through the resistor 22 and the PIN diode 24. The laser diode driver switch 28 is then opened, causing the shunt 18 to be in an open circuit state and thus no longer driving a path to ground from the output side of the main transmit switch 14. Upon the next pulse being generated by the pulse charger, the series of events described above recurs in time.

The shunt element 18, connected as described above, does not attenuate the outgoing pulse, yet provides for terminating any energy echoed back through the output transmission line 16. Although the shunt element is preferably connected to the output side of the main transmit switch 14, it can alternatively be connected (element 18a) to the back end of the charge line 12 in instances in which the main transmit switch 14 remains closed. It is important to remember that the shunt element device 18 must be selected according to the pulse voltage generated in the charge line 12. The shunt element 18 is optically activated by the PIN diode 24, which is reversed biased by the output pulse. The PIN diode 24 is then forced to a conducting state by photons generated from the laser diode 26. However, the laser diode 26 may be formed by either one or an array of laser diodes.

The PIN diode 24 carrier lifetime and its pulse repetition interval (PRI) are preferably chosen so that the PIN diode 24 is effectively an open circuit by the time the next pulse generated by the pulse charger 10 occurs. Preferably, depending on the pulse voltage and the PRI, standard FET and bipolar transistors or any active device could alternatively be used for the shunt element 18. Similarly, the shunt element 18 could also be made with an optically driven or electron beam drive bulk semi-conductor device such as GaAs, Si, Diamond or Silicon Carbide.

It should further be understood that, in the event that the shunt element 18 were moved to the back end of the charge line 12 (as in 18a), the main transmit switch 14 would preferably be altered to be of the type that stays closed during the time the reflections from the load 30 come back through the output line 16, through the switch 14, and through the charge line 12. The particular network used for the shunt element 18 would vary as a function of the application of the pulse transmitter, such as the size, weight, power or bandwidth involved.

Although only a preferred embodiment is specifically illustrated and described herein, it will be appreciated that many modifications and variations of the present invention are possible in light of the above teachings and within the purview of the appended claims without departing from the spirit and intended scope of the invention. For example, the shunt element could be other junction or bulk devices such as FET's, bipolar transistors, thrysistors, or bulk silicon, GaAs, silicon carbide, diamond, etc.

What is claimed is:

1. A pulse transmitter for terminating reflected waves, comprising:

a pulse charger for generating a pulse for charging a transmission line;

a charge line connected to said pulse charger;

an output cable for receiving a pulse from said charge line;

a transmit switch connected between said charge line and said output cable;

a shunt element connected between said transmit switch and ground; and wherein said charge line is of length L and said pulse received by said output cable from said charge line is of approximately 2 L in length.

2. A method for operating a pulse transmitter for terminating reflected waves, comprising the steps of:

charging a charge line of length L;

generating a pulse of approximately 2 L in length;

launching said pulse into an input of an output cable;

connecting said input of said output cable through a termination to ground, thus terminating any wave reflected back to said input of said output cable; and disconnecting said input of said output cable to said termination to ground.

3. The method of claim 2, further including the step of closing a transmit switch connected between said charge line and said input of said output cable, in order to launch said pulse into said input of said output cable.

4. The method of claim 3, wherein said transmit switch is operated such that it opens when current stops flowing through it.

5. A method for operating a pulse transmitter for terminating reflected waves, comprising the steps of:

charging a charge line of length L;

generating a pulse of approximately 2 L in length;

launching said pulse into an input of an output cable;

connecting said input of said output cable to ground by activating an element of a shunt circuit connected between said output cable input and ground, thus terminating any wave reflected back to said input of said output cable; and disconnecting said input of said output cable to ground.

6. The method of claim 5, wherein said element of said shunt circuit is activated by energizing a laser diode driver.

7. The method of claim 5, wherein said element of said shunt circuit which is activated is a PIN diode.

8. The method of claim 5, further including the step of deactivating said element of said shunt circuit after any reflected waves have been terminated.

9. The method of claim 3, further including the steps of:

maintaining said transmit switch in its closed position after said step of closing said transmit switch; and terminating any wave reflected back to said input of said output cable by connecting said charge line to ground rather than connecting said input of said output cable to ground.

10. The method of claim 5, wherein said element of said shunt circuit which is activated is one of a field effect and bipolar transistor.

11. The method of claim 4, wherein said transmit switch is comprised of an avalanche type device.

* * * * *